(12) United States Patent
Calhoun

(10) Patent No.: US 8,033,776 B2
(45) Date of Patent: Oct. 11, 2011

(54) PICKUP TRUCK BED SLIDER

(76) Inventor: Daniel Vandorn Calhoun, Tallahassee, FL (US)

( * ) Notice: Subject to any disclaimer, the term of this patent is extended or adjusted under 35 U.S.C. 154(b) by 141 days.

(21) Appl. No.: 12/456,921

(22) Filed: Jun. 24, 2009

(65) Prior Publication Data

US 2010/0327616 A1    Dec. 30, 2010

(51) Int. Cl.
*B60P 1/00* (2006.01)
(52) U.S. Cl. .......... 414/510; 414/513; 294/26; 296/39.2
(58) Field of Classification Search .................. 414/509, 414/510, 513, 522; 410/129, 130; 294/26; 296/39.2
See application file for complete search history.

(56) References Cited

U.S. PATENT DOCUMENTS

| | | | | |
|---|---|---|---|---|
| 138,476 | A * | 5/1873 | Caldwell | 414/339 |
| 781,992 | A * | 2/1905 | Beierschmitt | 414/522 |
| 2,737,304 | A * | 3/1956 | Curts | 414/522 |
| 2,965,251 | A * | 12/1960 | De Ganahl | 414/373 |
| 3,572,563 | A * | 3/1971 | Oliver | 414/514 |
| 3,978,996 | A | 9/1976 | Oltrogge | |
| 4,278,376 | A * | 7/1981 | Hunter | 410/130 |
| 4,431,360 | A * | 2/1984 | Maeno | 414/294 |
| 4,611,708 | A * | 9/1986 | Foster | 414/525.1 |
| 4,629,390 | A | 12/1986 | Burke | |
| 4,685,856 | A * | 8/1987 | Hesse, Jr. | 414/515 |
| 4,717,298 | A * | 1/1988 | Bott | 410/129 |
| 5,098,146 | A * | 3/1992 | Albrecht et al. | 296/26.09 |
| 5,167,479 | A * | 12/1992 | Bott | 410/121 |
| 5,273,390 | A * | 12/1993 | Crissman | 414/513 |
| 5,295,779 | A | 3/1994 | Mihalich et al. | |
| 5,314,290 | A * | 5/1994 | Lutz et al. | 414/509 |
| 5,340,266 | A | 8/1994 | Hodgetts | |
| 5,624,223 | A | 4/1997 | Lovato | |
| D380,706 | S * | 7/1997 | Gardner | D12/98 |
| 5,915,911 | A | 6/1999 | Hodgetts | |
| 5,938,262 | A * | 8/1999 | Mills | 296/26.09 |
| 5,997,233 | A * | 12/1999 | Whatley et al. | 414/25 |
| 6,398,283 | B1 * | 6/2002 | Knudtson et al. | 296/26.09 |
| D459,959 | S | 9/2002 | Fetterman et al. | |
| 6,976,720 | B1 * | 12/2005 | Bequette | 296/26.09 |
| 2002/0014505 | A1* | 2/2002 | Lance et al. | 224/404 |
| 2002/0090276 | A1* | 7/2002 | Earle et al. | 410/121 |
| 2002/0109368 | A1* | 8/2002 | Mink et al. | 296/26.13 |
| 2002/0140245 | A1* | 10/2002 | Coleman et al. | 296/26.09 |
| 2002/0180231 | A1* | 12/2002 | Fox | 296/26.01 |
| 2004/0178671 | A1 | 9/2004 | Smith | |

* cited by examiner

*Primary Examiner* — Gregory Adams
*Assistant Examiner* — Jonathan Snelting
(74) *Attorney, Agent, or Firm* — J. Wiley Horton

(57) ABSTRACT

A slide which slides along a retainer attached to the bed of a pickup truck. The slide has a rearward end proximate the tail gate and a forward end proximate the cab of the truck. The rearward end preferably has gripping features allowing a user to easily grasp the slide and pull it rearward within the fixed retainer. The slide's forward end has an upstanding foot which engages cargo within the bed and propels it toward the tailgate. Two or more such devices can be installed in parallel and used simultaneously to unload cargo.

19 Claims, 16 Drawing Sheets

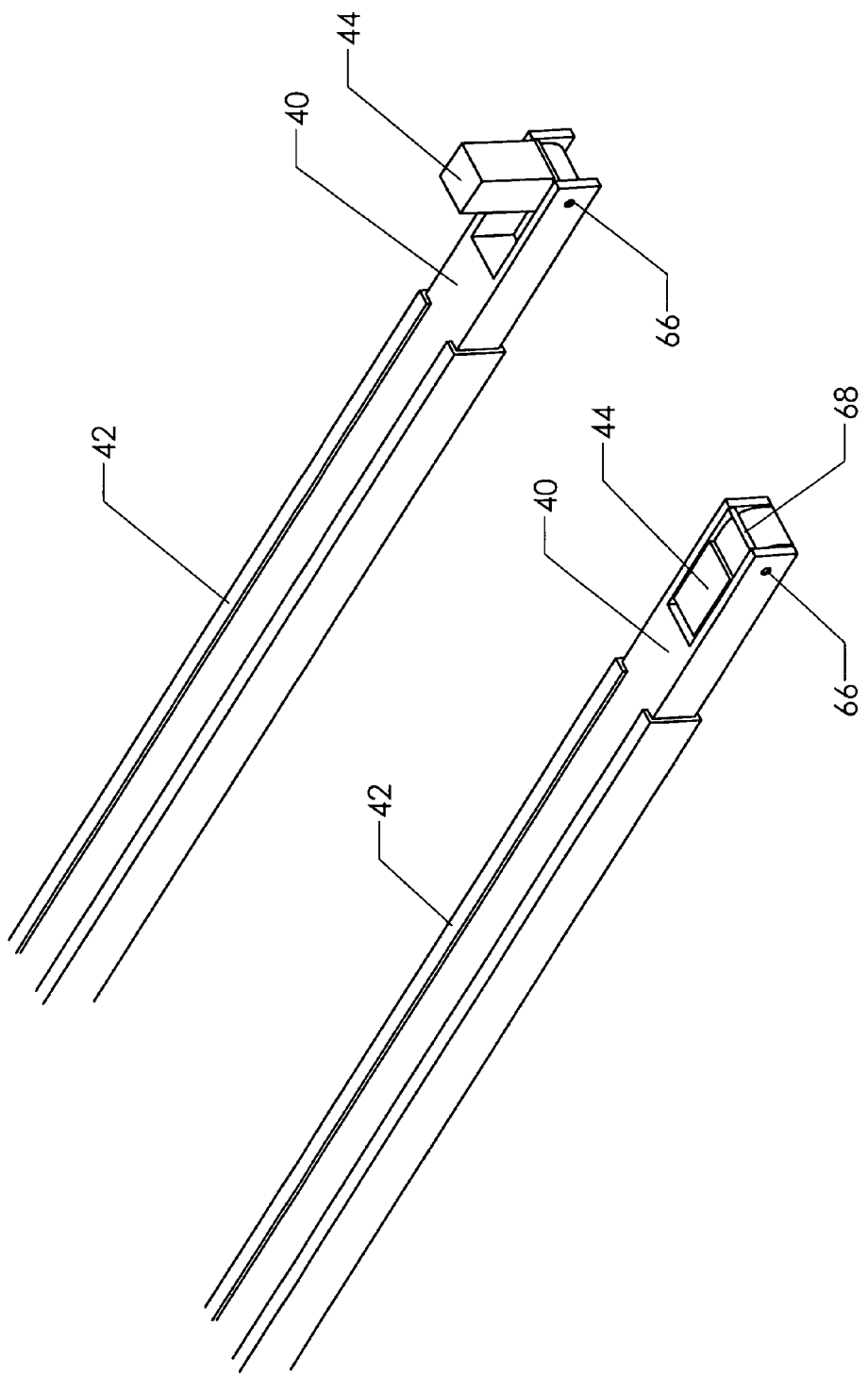

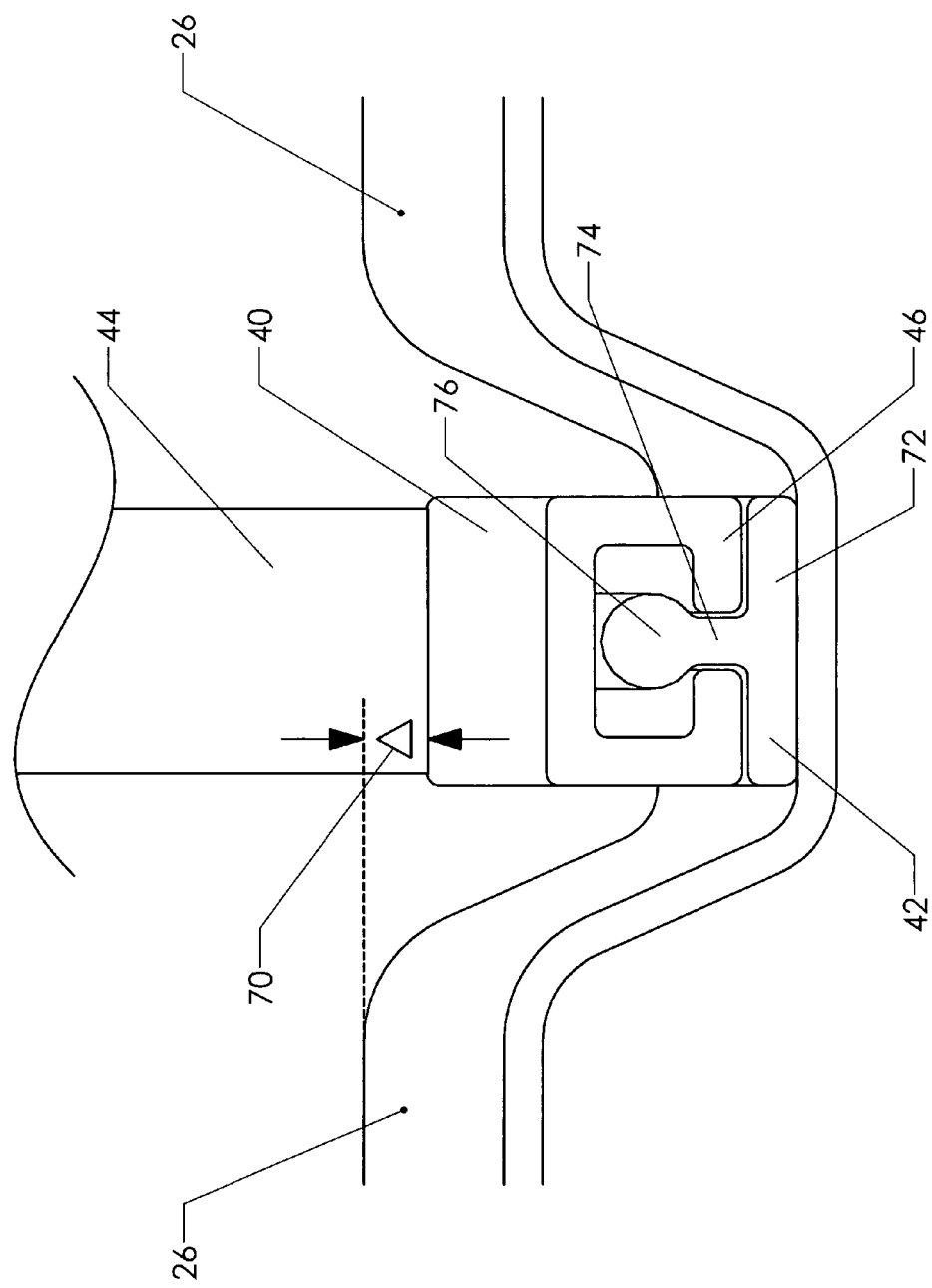

PICKUP TRUCK BED SLIDER

BACKGROUND OF THE INVENTION

1. Field of the Invention

This invention relates to the field of labor saving devices. More specifically, the invention comprises a sliding device which is useful for moving cargo items from the front of a pickup bed toward the rear of the pickup bed where they may be grasped by a user.

2. Description of the Related Art

FIG. 1 shows a prior art pickup truck 10. Bed 12 is bounded by left side wall 20, front wall 16, right side wall 22, and tail gate 14. Two wheel arches 24 interrupt the smooth surface of the bed. Tail gate 14 is shown folded down into the open position, where it lies approximately parallel to the bed. User 64 is standing immediately to the rear of the tail gate, in a position suitable for removing cargo from the bed.

Cargo 30 lies near front wall 16, adjacent to cab 18. Those familiar with the art will know that cargo often winds up in this position. Even if the cargo is originally placed near the tail gate, it will tend to slide forward under braking. Thus, it is common for a user to face a situation where the cargo lies near the cab, well out of reach. The only option then is to climb up into the bed and walk forward to retrieve the cargo. Climbing into the bed is an inconvenience at best. For older or physically challenged users, it may not be a viable option. Thus, it would be useful to have some means to bring the cargo from the position shown in FIG. 1 back toward the tail gate.

Any device which is to be mounted within the pickup truck bed must accommodate the existing features. FIG. 2 shows a more detailed view of bed 12. The reader will observe the presence of numerous parallel ribs 26. FIG. 3 shows a sectioned elevation view through the bed. The bed comprises a flat deck 28 which is periodically interrupted by upstanding ribs 26. The ribs serve to stiffen the deck section. They also make it easier to move cargo about, since cargo 30 only rests upon the top portion of the ribs, rather than across a much larger contact area of deck. This fact minimizes friction. It also creates one or more voids 32.

In recent years, the use of detachable liners for protecting pickup truck beds has become increasingly common. Such layers are typically made of a strong polymer such as ABS. FIG. 4 shows one such bed liner 34. The bed liner actually rests over the top of the deck. FIG. 5 shows a sectioned elevation view through the deck with bed liner 34 in place. Most bed liners are heavily corrugated to provide additional strength. Thus, there are many more bed liner ribs 36 than ribs 26 in deck 28. Most bed liners are made so that some of the bed liner ribs overlay ribs 26 in deck 28. This interlocking prevents lateral motion of the liner.

Cargo 30 rests on top of bed liner ribs 36. The reader will observe that the use of a bed liner creates many more voids 32 than the case of the deck alone. Also, the spacing between the voids is reduced. The presence of these voids provides one possible location for installing a cargo moving device.

Bed covers are another increasingly popular accessory. These cover the open top of the pickup truck bed and shelter the bed from the weather. The user can still store cargo in the bed by opening the tailgate and accessing the bed from the rear. When cargo winds up in the forward portion of the bed, however, the presence of a bed cover presents a substantial impediment to unloading that cargo. Although most bed covers can be opened in some fashion, this step is often time-consuming and laborious. Thus, the present invention preferably facilitates the unloading of cargo with a bed cover in place as well.

BRIEF SUMMARY OF THE PRESENT INVENTION

The present invention comprises a slide which slides in and out of a retainer attached in some fashion to the bed of a pickup truck. The slide has a rearward end proximate the tail gate and a forward end proximate the cab of the truck. The rearward end preferably has gripping features allowing a user to easily grasp the slide and pull it rearward within the fixed retainer. The slide's forward end has an upstanding foot which engages cargo within the bed and propels it toward the tailgate. Two or more such devices can be installed in parallel and used simultaneously to unload cargo.

BRIEF DESCRIPTION OF THE SEVERAL VIEWS OF THE DRAWINGS

FIG. 13 is a perspective view, showing a folding foot at the forward end of the slide.

FIG. 13A is a perspective view, showing an alternate embodiment of the slide and the retainer.

Figure 1:
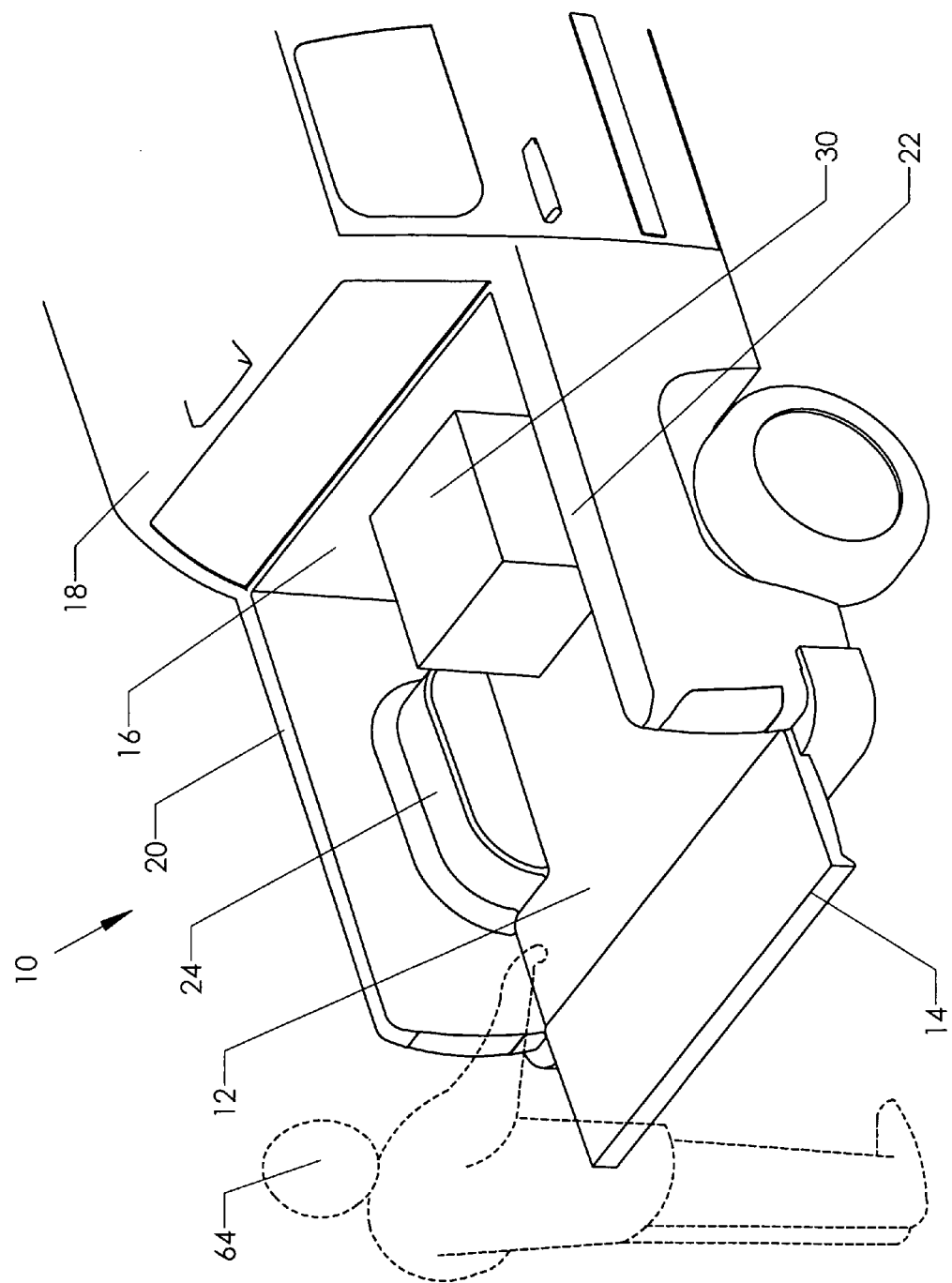
FIG. 1 is a perspective view, showing a prior art pickup truck bed.
Figure 2:
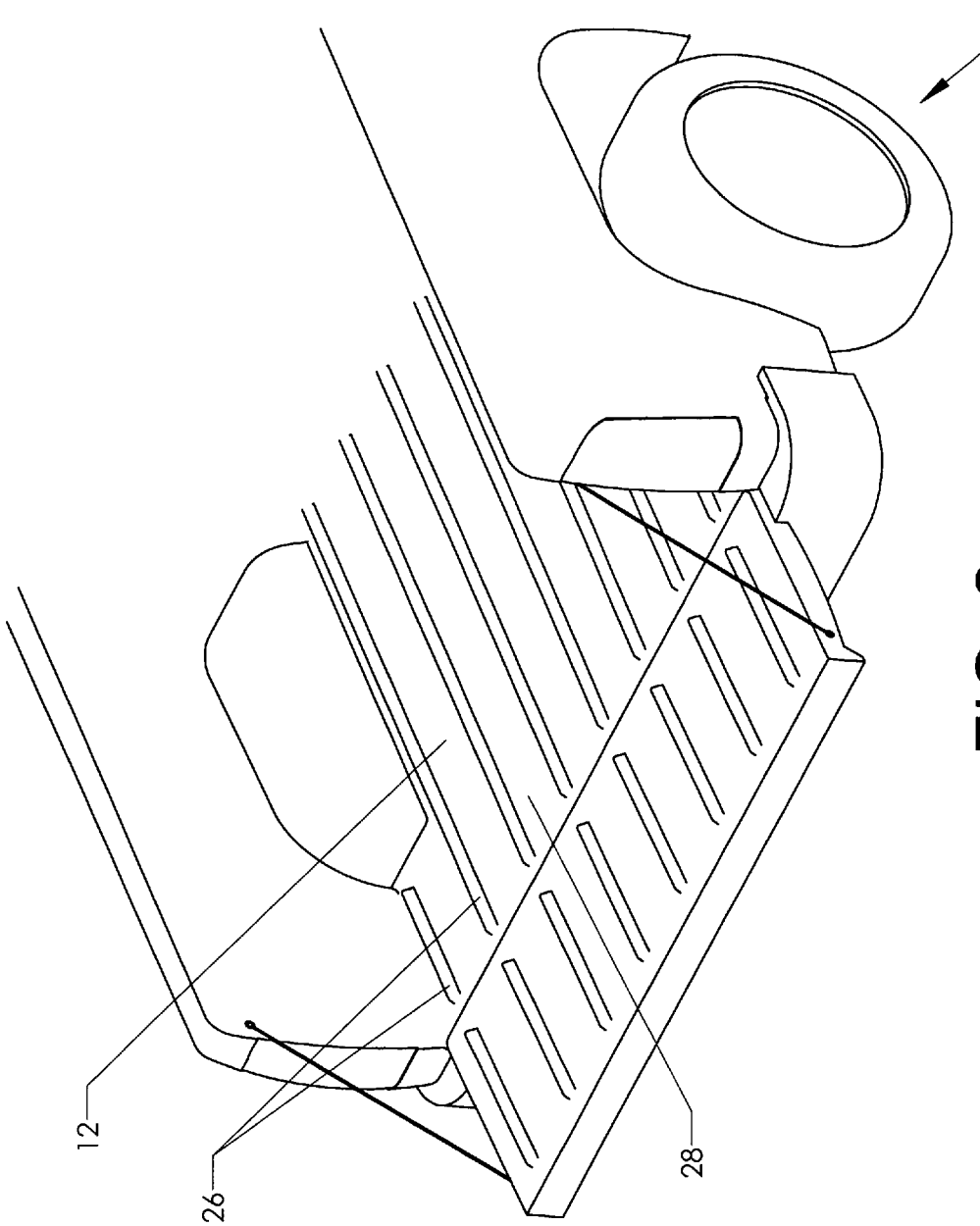
FIG. 2 is a detailed perspective view, showing an enlargement of the tail gate area.
Figure 3:
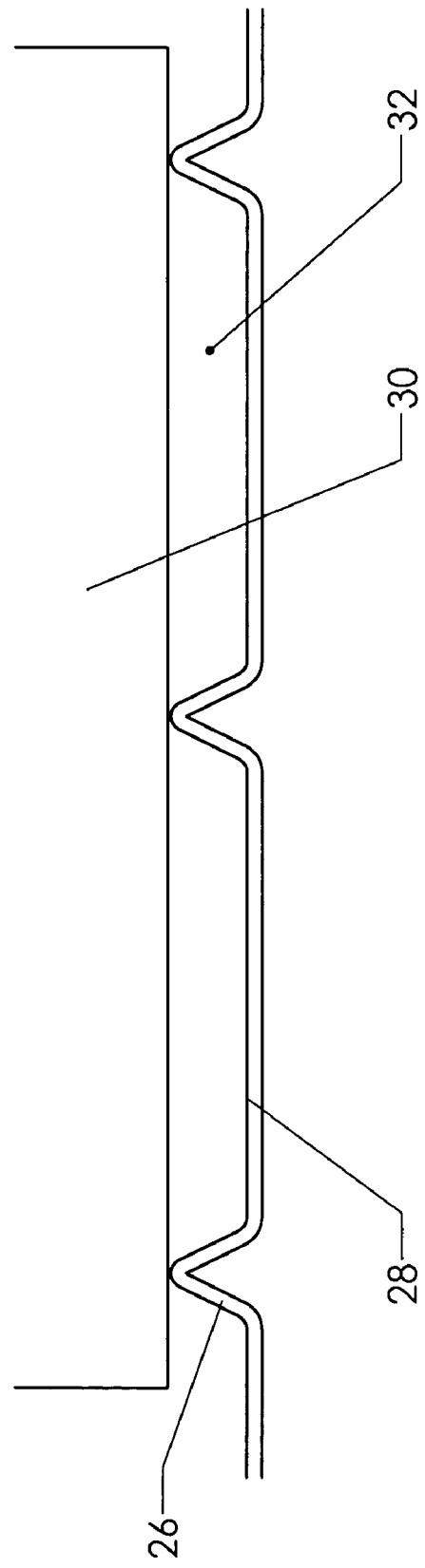
FIG. 3 is a sectioned elevation view, showing the nature of the deck.
Figure 4:
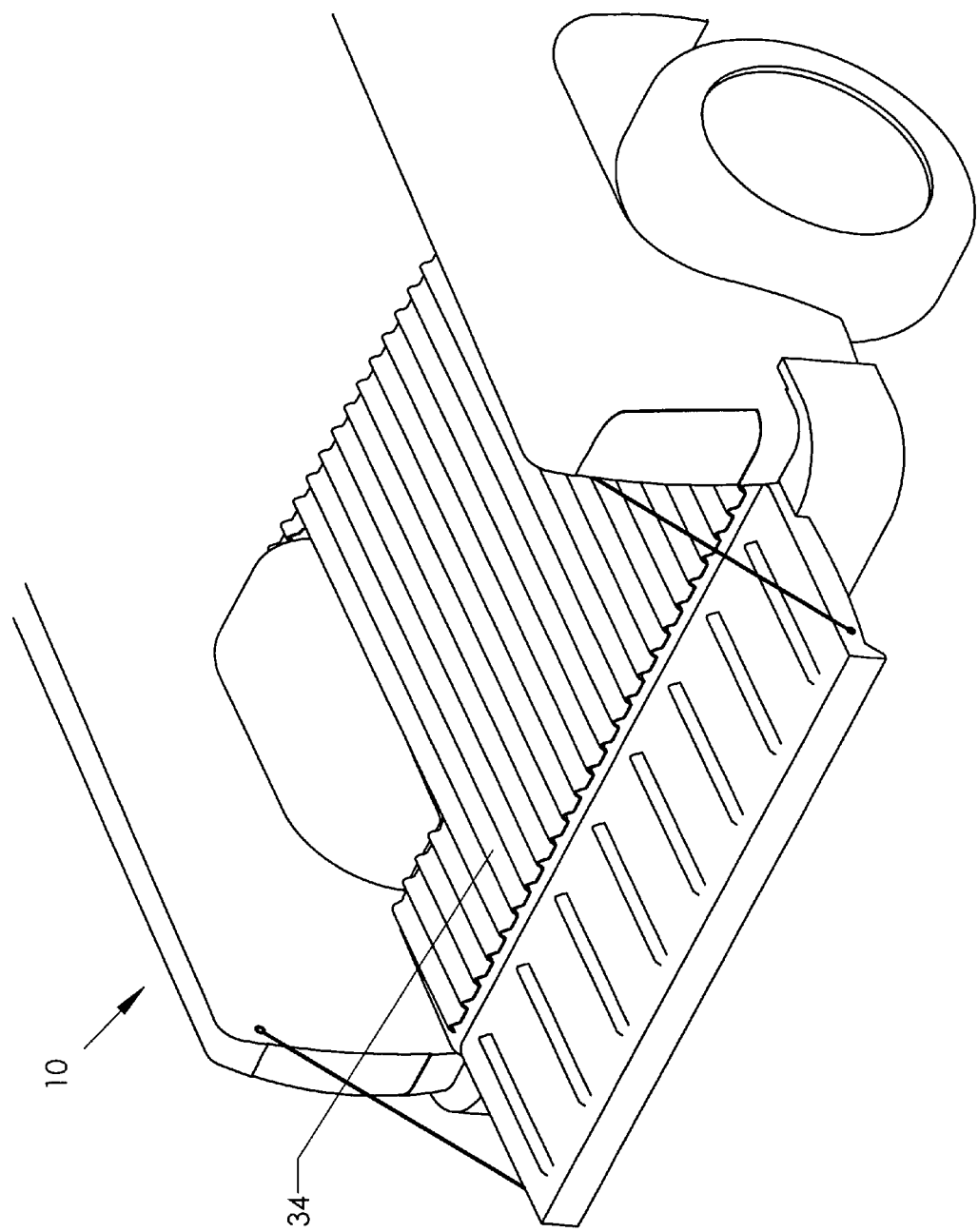
FIG. 4 is a detailed perspective view, showing the addition of a bed liner.
Figure 5:
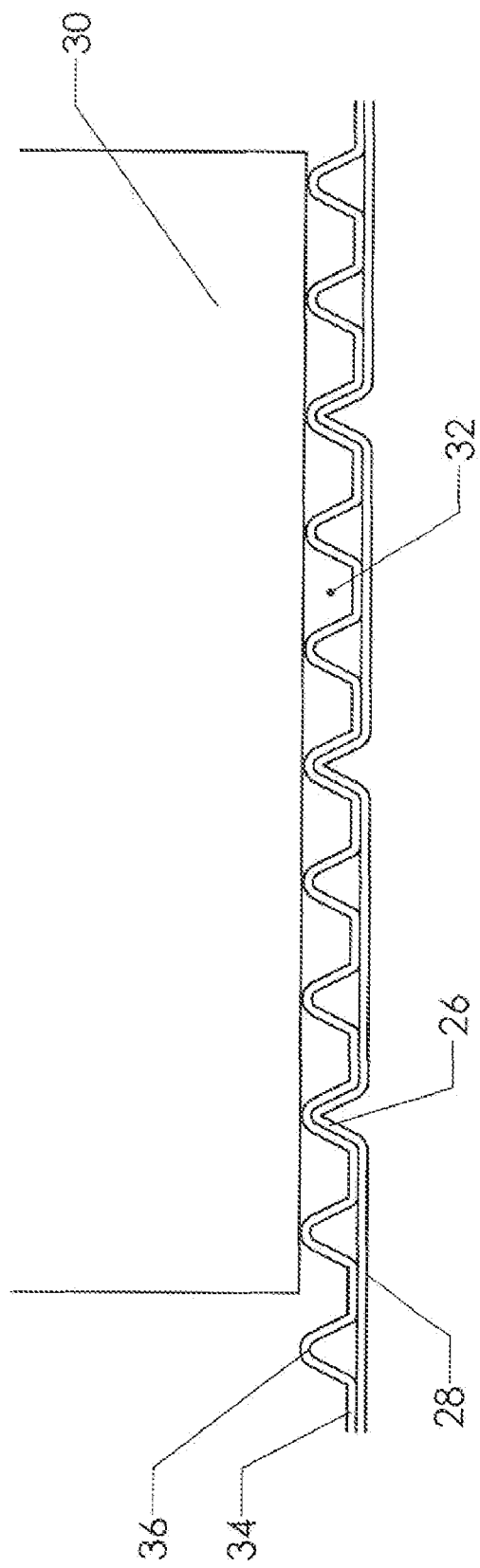
FIG. 5 is a sectioned elevation view, showing how the bed liner lies over the deck.

| REFERENCE NUMERALS IN THE DRAWINGS | | | |
|---|---|---|---|
| 10 | pickup truck | 12 | bed |
| 14 | tail gate | 16 | front wall |
| 18 | cab | 20 | left side wall |
| 22 | right side wall | 24 | wheel arch |
| 26 | rib | 28 | deck |
| 30 | cargo | 32 | void |
| 34 | bed liner | 36 | bed liner rib |
| 38 | cargo puller | 40 | slide |
| 42 | retainer | 44 | foot |
| 46 | overhang | 48 | slot |
| 50 | flange | 52 | flange |
| 54 | attachment | 56 | gripping feature |
| 58 | pivot joint | 60 | pivoting handle |
| 62 | handle portion | 64 | user |
| 66 | foot pivot joint | 68 | pin |

-continued

| REFERENCE NUMERALS IN THE DRAWINGS | | | |
|---|---|---|---|
| 70 | gap | 72 | base |
| 74 | upright | 76 | expanded top |

DETAILED DESCRIPTION OF THE INVENTION

Figure 6A:
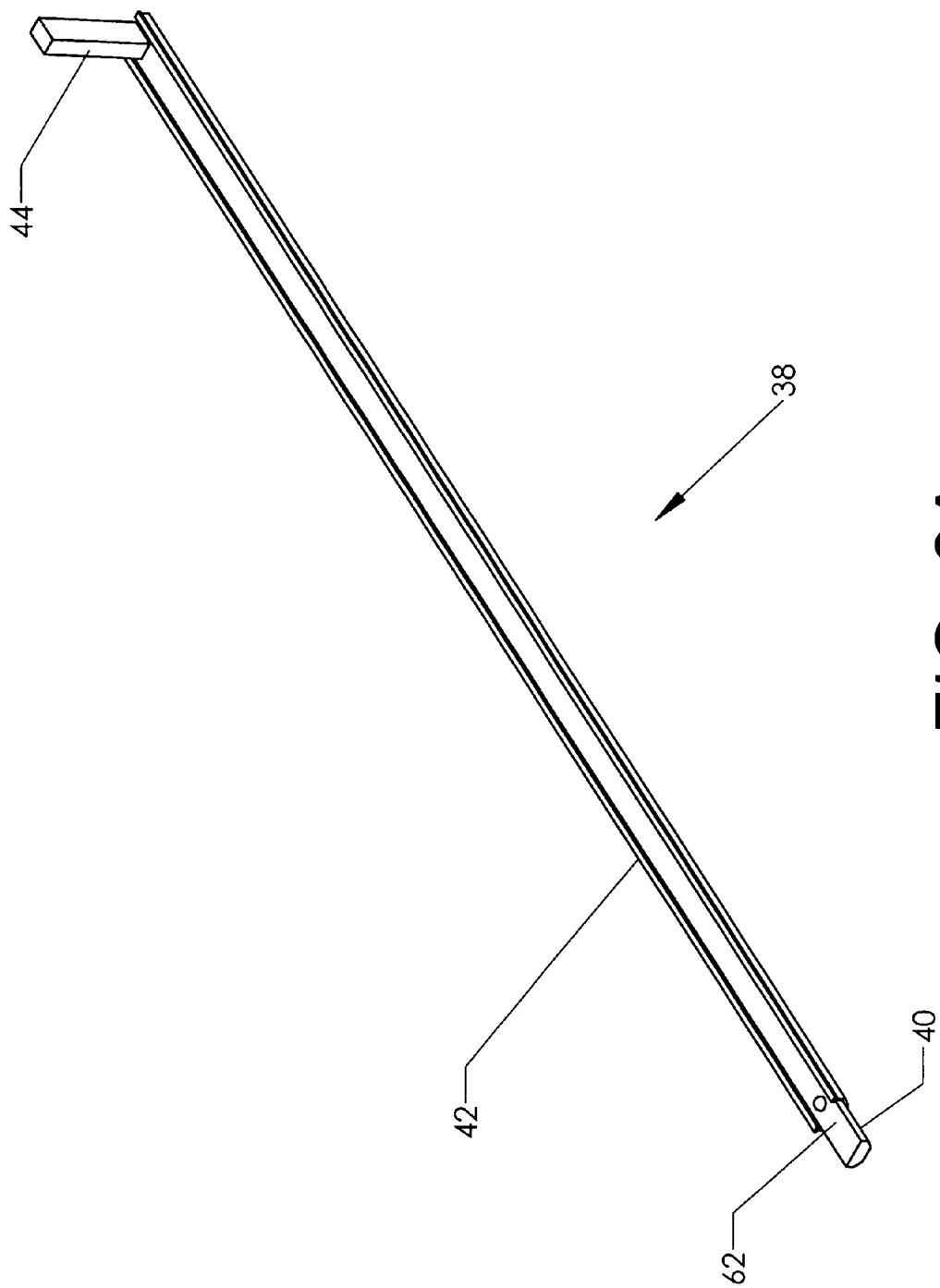
FIG. 6A is a perspective view, showing one embodiment of the present invention.

FIG. 6A shows one embodiment of the present invention. Retainer 42 is configured to be attached to the bed of a pickup truck. It has a hollow interior which receives slide 40 so that slide 40 may slide fore and aft within the hollow receiver. The slide features an upstanding foot 44 on its forward extreme and handle portion 62 on its rearward extreme. A user may grasp the handle portion and pull it rearward. This action pulls foot 44 rearward. The foot will then come in contact with cargo within the bed of the pickup truck and urge it rearward. The reader will observe that the retainer includes a slot opening upward. This allows the passage of foot 44, as will be described in more detail subsequently.

Figure 6B:
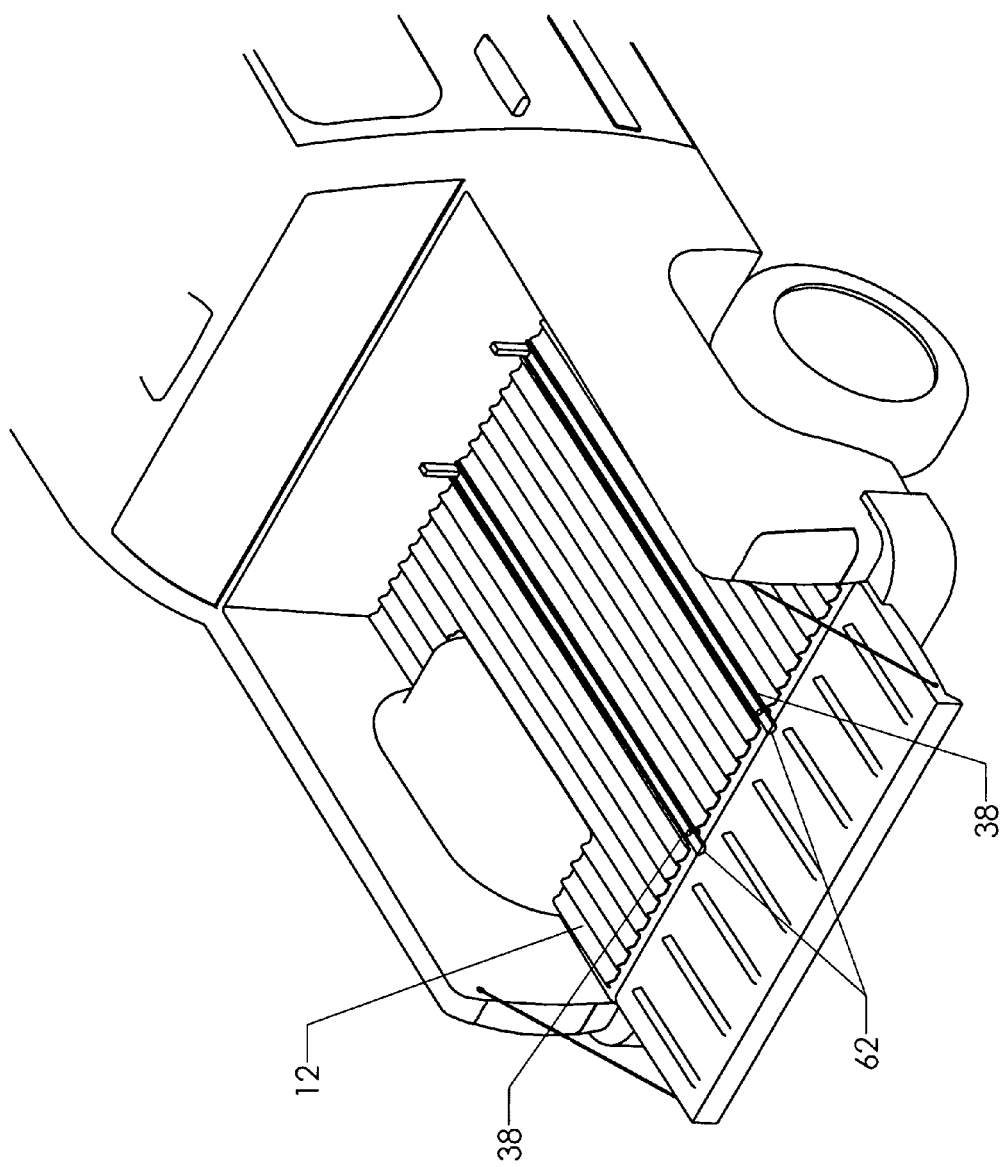
FIG. 6B is a perspective view, showing the embodiment of FIG. 6A installed in the bed of a pickup truck.

FIG. 6B shows a pair of cargo pullers 38 attached to bed 12 of a pickup truck. The cargo pullers are preferably situated in the voids lying between the upstanding ribs on the deck of the pickup truck bed. Handle portions 62 may be grasped by a user and pulled toward the rear. This will cause each foot 44 to travel toward the rear, thereby propelling cargo rearward to a point where the user can grasp the cargo directly.

Figure 7:
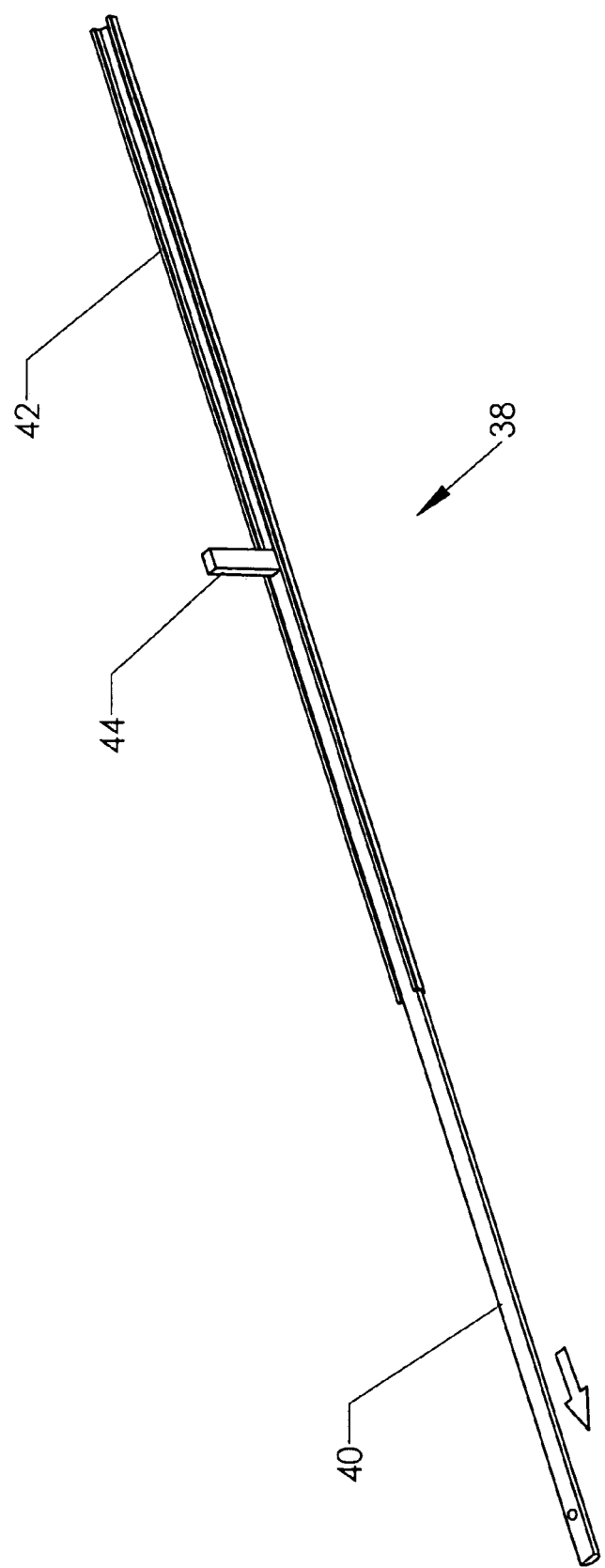
FIG. 7 is a perspective view, showing the extension of the slide out the rear of the retainer.

FIG. 7 shows cargo puller 38 with slide 40 pulled rearward. The reader will observe how foot 44 has traveled rearward almost to the end of the retainer. Cross pins or other suitable retaining devices can be used to ensure that slide 40 cannot be removed from retainer 44. These may be omitted in some embodiments, as it may at times be desirable to remove the slide.

Figure 8:
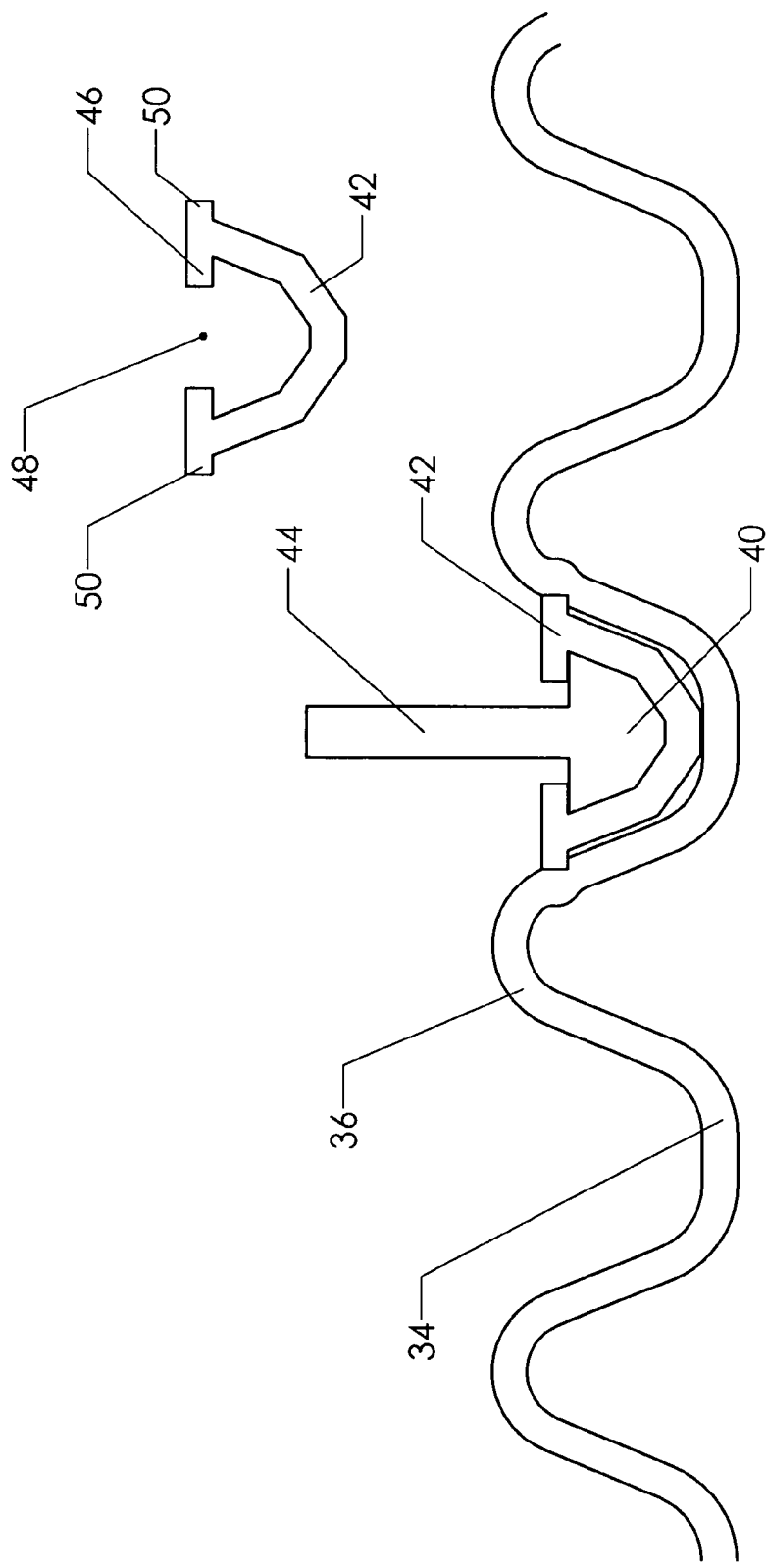
FIG. 8 is a sectioned elevation view, showing the placement of the invention between the ribs of a bed liner.

Of course, those skilled in the art will know that current pickup truck owners rarely leave the bed exposed. Instead, the bed is typically covered by a separate bed liner. These bed liners are corrugated plastic components. FIG. 8 shows a sectional elevation view through such a bed liner. The present invention can be attached to a bed liner using conventional mechanical fasteners, adhesives, or other suitable means. FIG. 8 shows another approach. It is convenient to make retainer 42 as an extrusion. Thus, it is possible to add features which can then mechanically interlock with a bed liner.

The upper view in FIG. 8 shows the extruded profile of retainer 42. A bounding side wall creates the internal cavity, which opens upward through slot 48. It is preferable to positively retain the slide within the retainer. This can be accomplished in many ways. One way is to include one or more overhangs 46, which lie over the top of the slide and prevent it from escaping upwards. The profile can also include a pair of protruding flanges 50. The reader will observe in the lower view of FIG. 8 how the bed liner can be formed to encompass and entrap flanges 50. The retainer(s) can actually be added to the bed liner as the bed liner is made, or the bed liner can include features which allow the retainer(s) to be easily installed subsequently.

Figure 9:
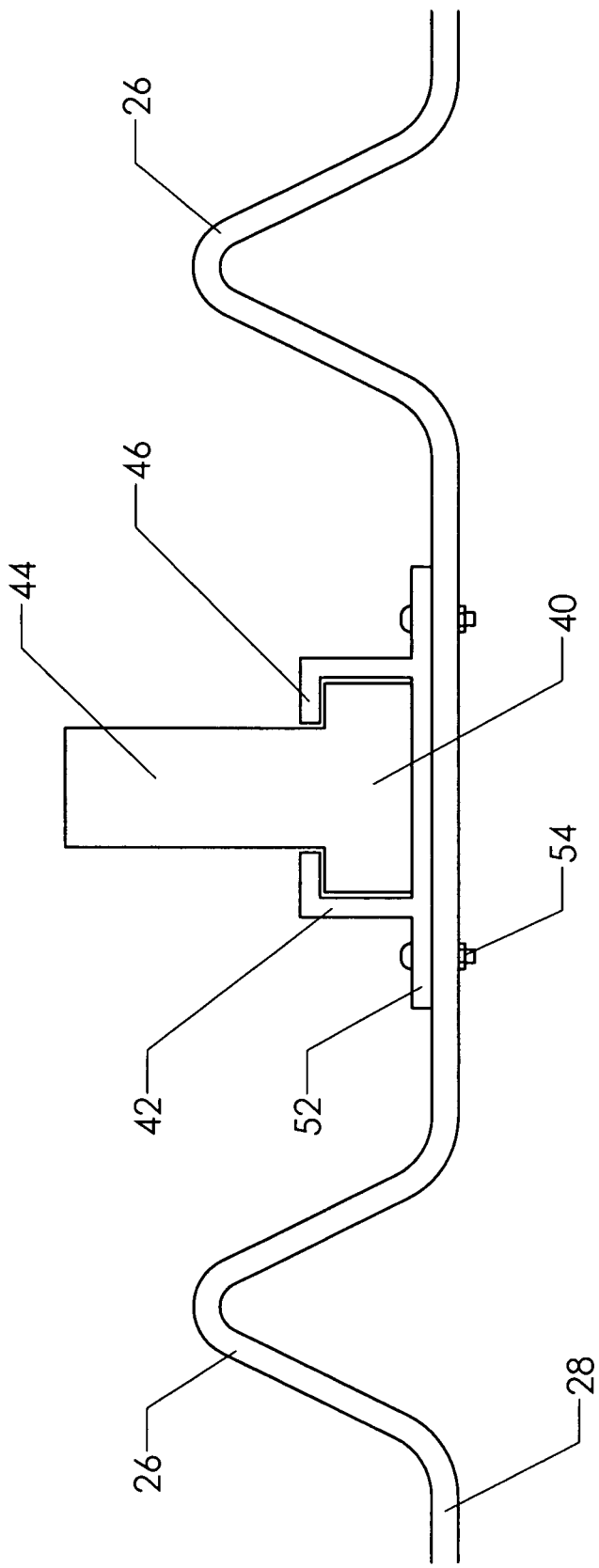
FIG. 9 is a sectioned elevation view, showing the placement of the invention between the ribs of a deck.

Of course, a different profile for the retainer may be preferred for those instances where the retainer is to be bolted directly to the deck of the pickup truck bed. FIG. 9 shows an embodiment with a different section for the slide and for the retainer. Retainer 42 is provided with a pair of flanges 52 near its lower extreme. These flanges allow attachments 54 to be made to deck 28. The attachment could be made by any suitable means, including bolts, rivets, a mechanical interlock, welding, etc.

A simple rectangular cavity is used in this embodiment. Of course, a corresponding rectangular profile for slide 40 is used as well. Other features can be added, such as debris channel in the bottom of the retainer which would allow the accumulation of debris without jamming the slide.

The reader will observe in FIGS. 8 and 9 that the top of the retainer preferably lies even with or below the top of the ribs (whether the ribs are part of the deck or part of a bed liner). While not essential to the operation of the invention, this feature allows cargo to be easily moved over the top of the retainer and slider.

Figure 10:
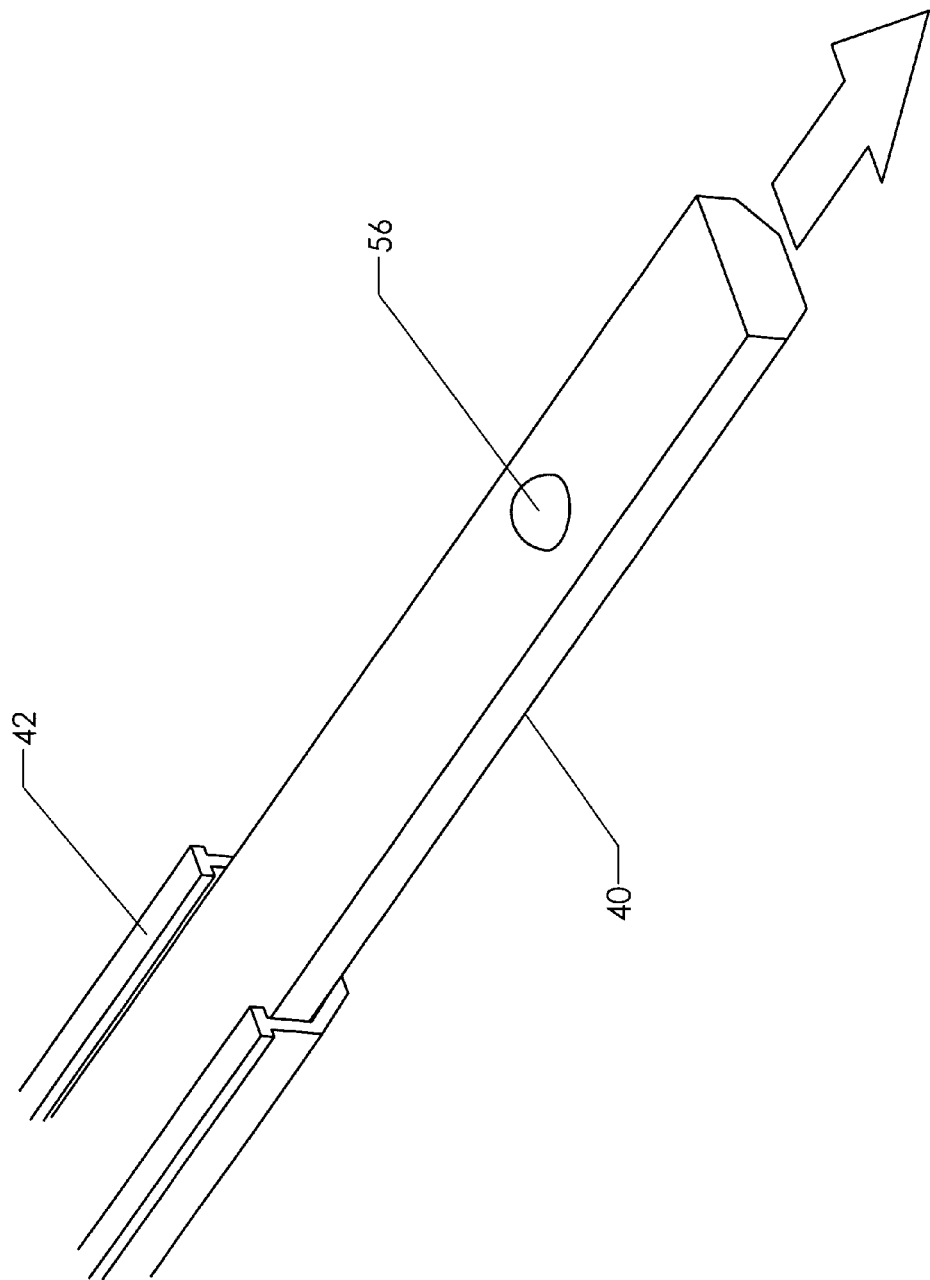
FIG. 10 is a perspective view, showing the addition of a gripping feature to the rearward portion of the slide.

It is important that the user be able to grip the handle portion of the slide. In some embodiments, the slide may not extend beyond the rear of the retainer when the device is in the stowed position. Thus, the addition of gripping features to the handle portion will increase the device's utility. FIG. 10 shows the addition of gripping feature 56 to the handle portion. The gripping feature can assume many forms, such as a cavity, a through-hole, a raised bump (as shown), a knurled section, a scalloped section, combinations of these, etc. The gripping feature or features allow a user to engage the slide with a finger or thumb and urge it rearward to the point where it can be grasped with the entire hand. A raised portion (such as a bump) could be substituted for the through hole.

Figure 11:
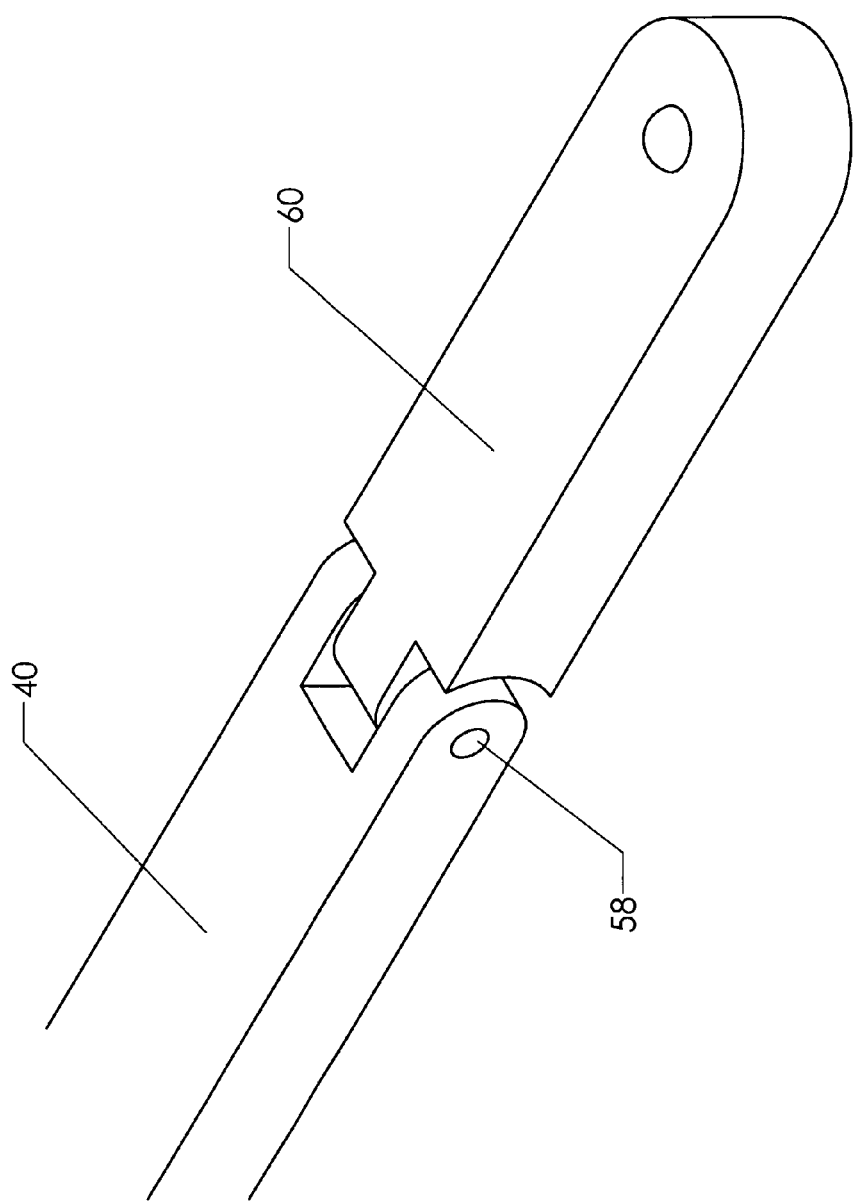
FIG. 11 is a perspective view, showing the addition of a pivoting handle to the rearward portion of the slide.
Figure 12:
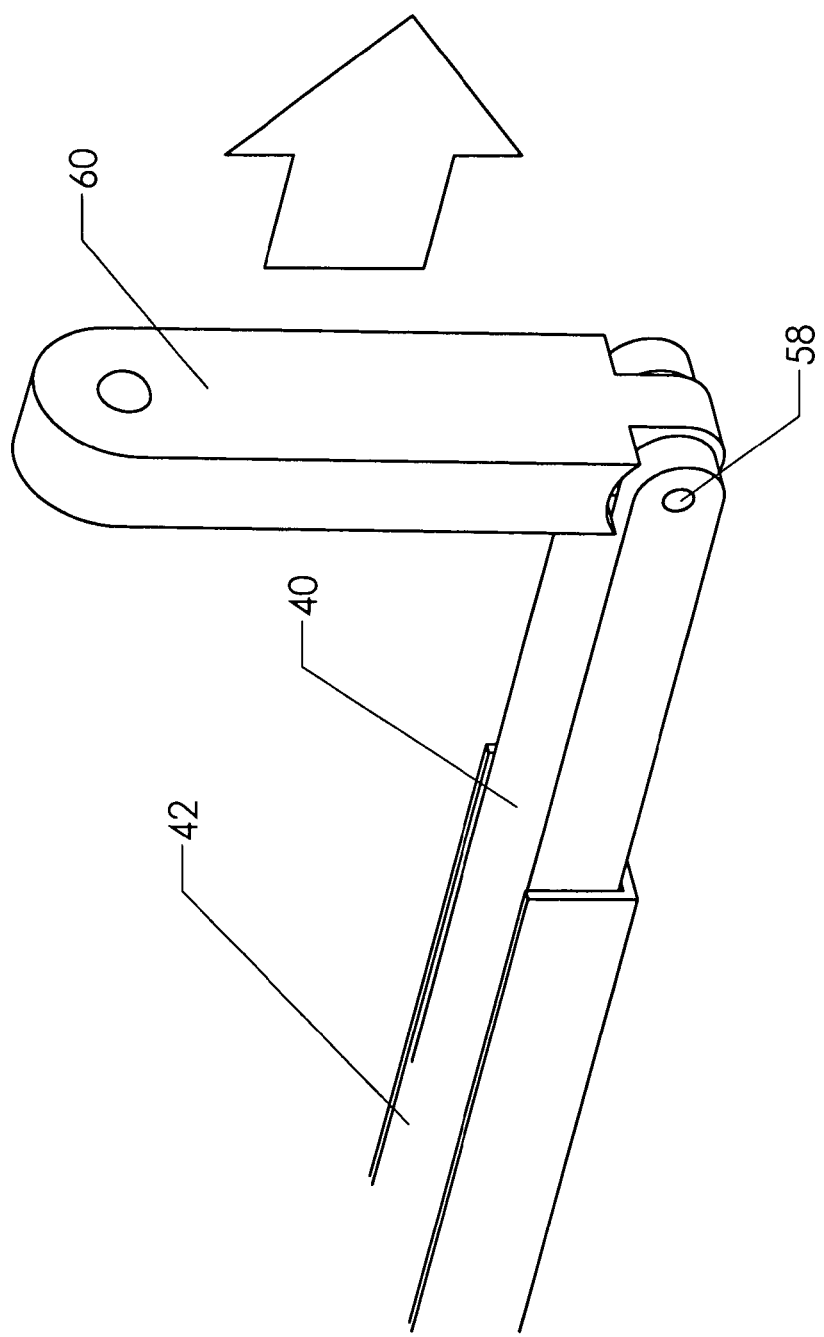
FIG. 12 is a perspective view, showing the handle of FIG. 11 folded upward or use.

FIG. 11 shows another type of gripping feature. The handle portion of the slide is equipped with pivot joint 58 which allows pivoting handle 60 to pivot upward. FIG. 12 shows pivoting handle 60 after it has been pivoted up 90 degrees. It provides a perpendicular grip which the user may grasp with one or both hands and pull the slide in the direction indicated by the arrow.

In some situations having a rigid foot 44 can cause problems. FIG. 13 shows another embodiment in which foot 44 pivots with respect to retainer 42. Foot 44 pivots about foot pivot joint 66. When in the raised position, foot 44 is prevented from further rotation by interference with pin 68. The raised foot may thereby be used to engage objects within the bed and urge them toward the rear. In the upper view foot 44 is pivoted upward into a position where it is ready to engage cargo within the bed. In the lower view it is pivoted downward to lie flush with the slide.

The pivoting of the foot in this embodiment can be accomplished by any suitable means. However, since an object of the invention is to eliminate the need to reach into the forward portion of the bed, it is desirable to provide a mechanism which the user can actuate near the rear of the slide in order to deploy and collapse the pivoting foot. One such mechanism would be an actuating rod passing through the middle of the slide. Alternatively, features could be added to the forward portion of retainer 42 to engage and deploy the pivoting foot.

Figure 13B:
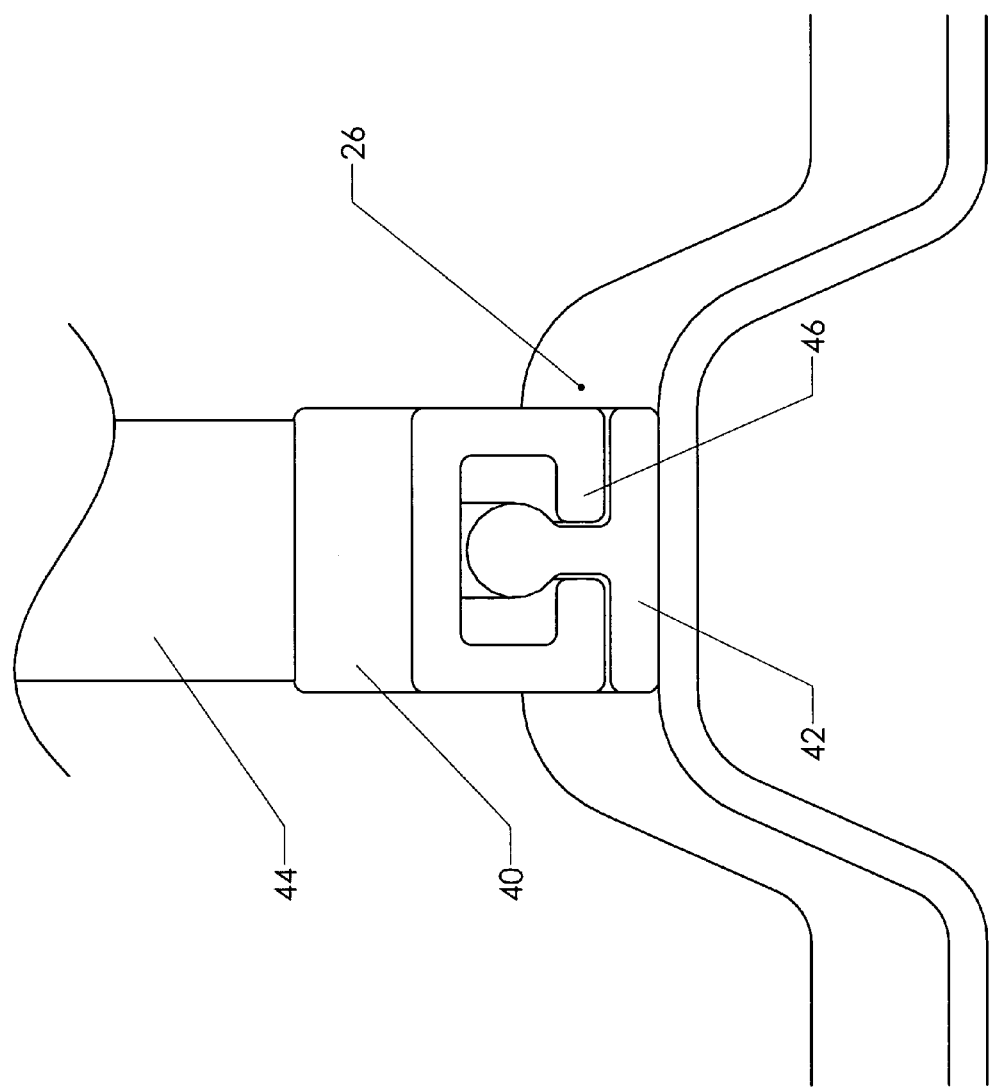
FIG. 13B is a perspective view, showing an alternate embodiment of the slide and the retainer.

There are of course a variety of different approaches to implementing the present invention. Those skilled in the art will appreciate that the embodiments shown in FIGS. 6-13 have a tendency to trap dirt and debris within retainer 42 (since it incorporates a slot which opens upward). This tendency may be reduced by inverting the stationary and moving components of the design. FIGS. 13A and 13B show this alternative.

In FIG. 13A, retainer 42 assumes a completely different form. It has a horizontally oriented base 72 which attaches to the bed or bedliner of the pickup truck. The orientation of FIG. 13A is looking from the tailgate end of the bed toward foot 44. It is not a true elevation view but rather a perspective view, since the vantage point is slightly above the bed.

A vertical upright 74 protrudes upward from the horizontal base 72 of retainer 42. Expanded top 76 is located near the top of upright 74, creating a total shape that is reminiscent of a railroad rail. Slide 40 slides over and engages retainer 42. Although gravity will tend to hold the slide in position, it is preferable to include mechanical interlocking features so that it does not come loose. A pair of overhangs 46 is provided. These interfere with expanded top 76 if slide 40 is urged upward with respect to retainer 42.

Foot 44 is provided on the end of the slide lying next to the cab, as for the other embodiments. The foot can be a folding or fixed type. A folding or fixed handle may be provided on the opposite end.

Clearance between retainer 42 and slide 40 is preferably provided so that dirt and debris which does come to rest between the two components will not significantly impair the sliding action of the device. The reader will note that gap 70 exists between the upstanding ribs 26 of the pickup bed and the upper surface of slide 40. In this configuration, the weight of the cargo within the bed rests on the bed itself and not the slide. Only foot 44 sticks up far enough to engage the cargo.

Of course, it may be preferably in some embodiments to have the cargo rest on the slide itself. FIG. 13B shows this option, in which the upper surface of slide 40 rests well above the top of the ribs of the pickup truck bed (FIG. 13B is another perspective view looking from the tailgate end of the bed, with the vantage point being just above the level of the bed). This can be accomplished by mounting retainer 42 on top of one or more ribs 26 (as shown) or by mounting the retainer in between the ribs but making the slide tall enough to protrude above the ribs. Whichever approach is used, the weight of cargo in the bed will actually rest upon the slide. For such an embodiment, the components will need to be made of strong and durable materials—such as extruded aluminum. It may even be desirable to provide linear bearings to reduce friction between retainer 42 and slide 40. As such components are well understood in the art, they have not been illustrated in the drawing views.

The invention can be created using a variety of materials and manufacturing methods. As mentioned previously, it is convenient to make the retainer as an extrusion. Aluminum is therefore a good choice for this component. Aluminum could also be used to make the slide. Another possibility is using pultruded fiberglass (a fiber reinforced plastic in which the strands run parallel to the long axis of the part). Where strength is not critical, one could even use fiber reinforced thermoplastics for all the components.

Although the preceding description contains significant detail, it should not be construed as limiting the scope of the invention but rather as providing illustrations of the preferred embodiments of the invention. The inventive device could be realized in many different ways. Thus, the scope of the invention should be fixed by the following claims rather than the examples given.

Having described my invention, I claim:

1. A cargo moving tool allowing a user to move cargo within a bed of a pickup truck, said bed being bounded by a front wall and a tail gate, comprising:
    a. at least three parallel ribs on said bed running from proximate said tail gate to proximate said front wall, with each of said ribs including a top, and with said ribs forming a plurality of voids therebetween;
    b. a retainer attached to said bed of said pickup truck within one of said plurality of voids, including
        i. a forward portion proximate to said front wall of said bed,
        ii. a rearward portion proximate to said tail gate of said bed,
    c. a slide slidably engaged with said retainer so that said slide moves between a forward position and a rearward position, including
        i. a first end having a foot protruding upward and extending above said retainer,
        ii. a second end having a handle portion;
    d. wherein when installed said slide rests in said forward position, with said slide having a length sufficient so that said foot lies proximate said front wall of said bed and said handle portion lies proximate said tail gate of said bed;
    e. said retainer lies below said tops of said ribs;
    f. said foot extends above said tops of said ribs; and
    g. all portions of said slide other than said foot lie below said tops of said ribs.

2. A cargo moving tool as recited in claim 1 wherein said foot includes a foot pivot joint allowing said foot to fold flat when not in use.

3. A cargo moving tool as recited in claim 1, wherein said slide is engaged with said retainer by an overhang in said retainer.

4. A cargo moving tool as recited in claim 1, wherein said slide is engaged with said retainer by an overhang in said slide.

5. A cargo moving tool as recited in claim 1, wherein said handle portion of said slide includes a gripping feature.

6. A cargo moving tool as recited in claim 1, wherein said handle portion includes a pivot joint allowing said handle portion to pivot upward with respect to said slide, with said handle portion being long enough so that when said handle portion is pivoted upward said handle portion lies above said tops of said ribs.

7. A cargo moving tool as recited in claim 1, wherein said retainer is attached to said bed by a plurality of mechanical fasteners.

8. A cargo moving tool as recited in claim 1, wherein said retainer is attached to said bed by a plurality of welds.

9. A cargo moving tool as recited in claim 1, wherein said retainer is attached to said bed by adhesive.

10. A cargo moving tool allowing a user to move cargo within the bed of a pickup truck, said bed being bounded by a front wall and a tail gate, comprising:
    a. a bed liner attached to said bed, said bed liner including at least three parallel ribs running from proximate said tail gate to proximate said front wall, with each of said ribs including a top, and with said ribs forming a plurality of voids therebetween;
    b. a retainer attached to said bed liner, including
        i. a forward portion proximate to said front wall of said bed,
        ii. a rearward portion proximate to said tail gate of said bed,
    c. a slide slidably engaged with said retainer so that said slide moves between a forward position and a rearward position, including
        i. a first end having a foot protruding upward,
        ii. a second end having a handle portion,
    d. wherein when installed said slide rests in said forward position, with said slide having a length sufficient so that said foot lies proximate said front wall of said bed and said handle portion lies proximate said tail gate of said bed;
    e. wherein when said slide is in said forward position, said slide substantially covers said retainer;
    f. said retainer lies below said tops of said ribs;

g. said foot extends above said tops of said ribs; and h. all portions of said slide other than said foot lie below said tops of said ribs.

11. A cargo moving tool as recited in claim 10 wherein said foot includes a foot pivot joint allowing said foot to fold flat when not in use.

12. A cargo moving tool as recited in claim 10, wherein said slide is engaged with said retainer by an overhang in said retainer.

13. A cargo moving tool as recited in claim 10, wherein said slide is engaged with said retainer by an overhang in said slide.

14. A cargo moving tool as recited in claim 10, wherein said handle portion of said slide includes a gripping feature.

15. A cargo moving tool as recited in claim 10, wherein said handle portion includes a pivot joint allowing said handle portion to pivot upward with respect to said slide, with said handle portion being long enough so that when said handle portion is pivoted upward said handle portion lies above said tops of said ribs.

16. A cargo moving tool as recited in claim 10, wherein said retainer is attached to said bed liner by a plurality of mechanical fasteners.

17. A cargo moving tool as recited in claim 10, wherein:

a. said retainer includes a vertically extended upright with an expanded top proximate an upper extreme of said upright; and b. said slide includes a pair of overhangs with a gap therebetween, wherein said gap is wide enough to allow the passage of said upright therebetween but narrow enough to prevent the passage of said expanded top therebetween.

18. A cargo moving tool as recited in claim 17, wherein said retainer includes a base and said overhangs are positioned to rest on top of said base.

19. A cargo moving tool as recited in claim 17, wherein said handle portion of said slide includes a gripping feature.

* * * * *